March 8, 1927.

B. ZUCKER

CHOCK BRAKE

Filed Nov. 28, 1924

1,619,845

INVENTOR
Benjamin Zucker
BY
ATTORNEY

Patented Mar. 8, 1927.

1,619,845

UNITED STATES PATENT OFFICE.

BENJAMIN ZUCKER, OF NEW YORK, N. Y.

CHOCK BRAKE.

Application filed November 28, 1924. Serial No. 752,704.

My invention relates to braking means and refers particularly to chock brakes for vehicle wheels.

The object of my invention is a cheap and efficient braking means for vehicles which is particularly adapted for heavy wagons when descending hills.

One of the serious objections to the ordinary chock brake, or drag brake, is that the wheel will pass completely through the brake unless the chain attaching it to the wagon is of the exact length to maintain it beneath the revolving wheel, and thus the brake will be ineffective.

Another objection to the ordinary brake of this character, is that the wheel will become displaced from within the brake because of the rough road over which it is passing, and this is particularly true when employed with heavy wagons moving over very strong and rough hills. This releases the wheel from the restraining action of the brake and allows it to move unimpeded.

The device of my invention overcomes the above and other objectionable features of the known drag brakes, and presents a means whereby the braking action is effective and permanent.

The device of my invention comprises a chock brake having a bottom member, preferably arc-shaped, with two extended flanges positioned angularly with respect to each other and of such size and spacement as to allow the wheel to enter between the flanges but will not allow it to pass therethrough the flanges gripping the wheel rim and co-acting with a chain as an effective means for stopping its revolution and for maintaining the wheel within the brake against accidental displacement.

In the accompanying drawings illustrating one form of the device of my invention, similar parts are designated by similar numerals.

Figure 1:
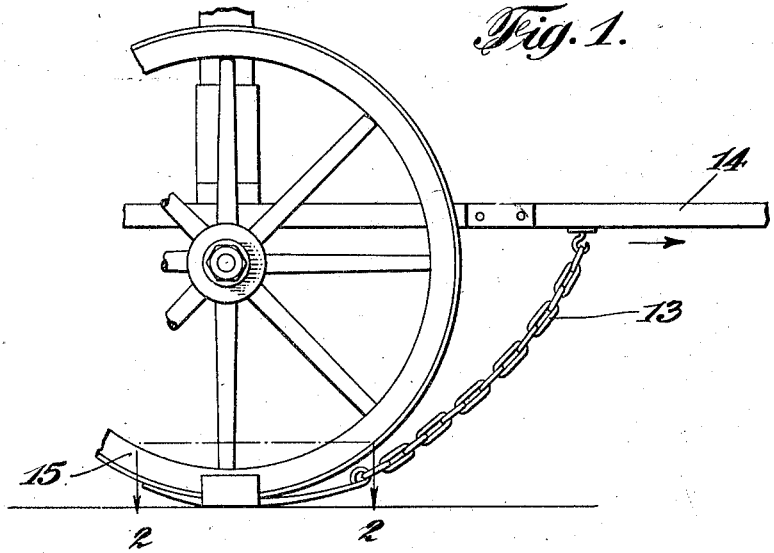
Figure 1 is a side view of one form of my device in braking operation.
Figure 2:
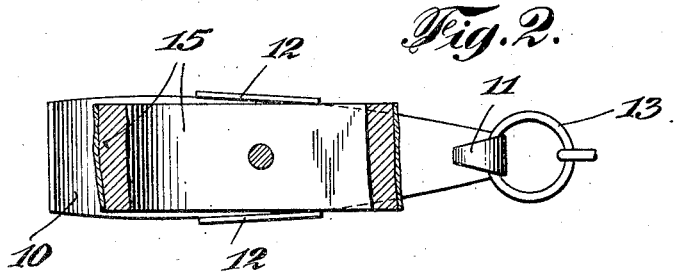
Figure 2 is a cross-section through the line 2—2 of Figure 1.
Figure 3:
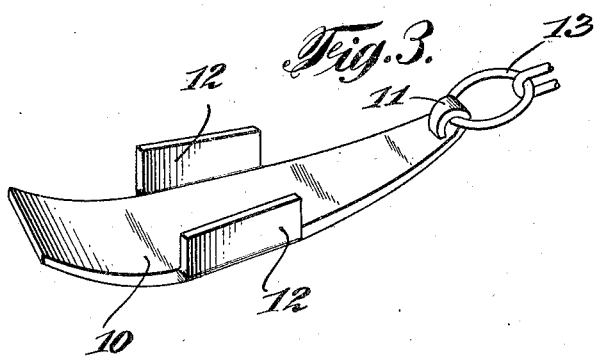
Figure 3 is a perspective view of the chock brake of Figure 1.

The particular form of the device of my invention shown in the accompanying drawings comprises a chock block having the arc-shaped bottom 10, the width of which is gradually reduced toward the ring formed end 11. Fixedly attached to, or integral with, the sides of the bottom 10 are two extended flanges 12, 12, which are in angular planes with respect to each other. The ring-formed end 11 carries a chain 13 which may be fixedly attached to a portion of the vehicle 14.

The flanges 12, 12 are at such angles to each other that the wheel of a vehicle 15 can enter between them at the wider portion but cannot pass through the narrow portion thereof.

The operation of the device is as follows:

The chock is placed upon the ground in front of one of the vehicle wheels, the forward movement of which will cause the wheel rim to enter the chock at the broad portion thereof, the rim thus passing forwardly between the flanges 12, 12, the angular position of which, with respect to each other, is such that the wheel cannot emerge therefrom, thus wedging the wheel tightly between the flanges 12, 12.

It is evident therefore, that the wheel rim is firmly held by the chock and that it can not be accidentally removed therefrom by irregular movements due to the unevenness of the road over which the vehicle is passing.

I do not limit myself to the particular size, shape, number or arrangement of parts as shown and described, as these are given simply as a means for clearly explaining the device of my invention.

What I claim is:—

1. In a chock brake, in combination, a base, a plurality of upwardly extended flanges positioned angularly with respect to each other adapted to abut upon the sides of the rim of an inserted wheel thereby preventing the passage of the wheel completely through the device carried by the base and a chain capable of attaching the base to a vehicle.

2. In a chock brake, in combination, a curved base, a plurality of upwardly extended flanges positioned angularly with respect to each other adapted to abut upon the sides of the rim of an inserted wheel thereby preventing the passage of the wheel completely through the device carried by the base and a chain capable of attaching the base to a vehicle.

Signed at New York city, in the county of New York and State of New York, this 26th day of November, 1924.

BENJAMIN ZUCKER.